Feb. 13, 1968    R. ELGNER    3,368,502
DOUGH-ROLLING DEVICE
Filed June 6, 1966    2 Sheets-Sheet 1

INVENTOR
RUDOLF ELGNER

BY Hane a Nydick
ATTORNEYS

INVENTOR
RUDOLF ELGNER
BY Hane + Nydick
ATTORNEYS

United States Patent Office 3,368,502
Patented Feb. 13, 1968

3,368,502
DOUGH-ROLLING DEVICE
Rudolf Elgner, Markt Einersheim, Germany, assignor to A. Fritsch KG., Markt Einersheim, Germany, a company of Germany
Filed June 6, 1966, Ser. No. 555,307
Claims priority, application Germany, June 30, 1965, F 46,477
11 Claims. (Cl. 107—4)

The present invention relates to a dough-rolling device of the kind including a pair of coacting pressure rollers, an upper transport conveyor disposed posteriorly of the pressure rollers and a lower transport conveyor disposed below the upper conveyor, a draw mat acting upon the dough when and while the dough is traveling on the upper conveyor and a pressure plate acting upon the dough when and while the dough is traveling on the lower conveyor.

There are known dough-rolling devices of the general kind above referred to in which the dough, after having passed the pressure rollers, is folded by means of a short draw mat or worked by means of a rolling board. Experience has shown that such folding and other working of dough which has been rolled out by the pressure rollers is not entirely satisfactory. In particular, too few layers are obtained, and the sealing of a dough piece at its end is insufficient. Such insufficient sealing of dough pieces is particularly undesirable with dough used for making white bread, as white bread frequently requires specific and well defined shapes at the ends of the dough pieces.

It is a broad object of the invention to provide a novel and improved dough-rolling device of the general kind above referred to with which very thorough rolling, kneading and other working of the dough can be obtained.

The afore-pointed-out object, feature and advantage, and other objects, features and advantages which will be pointed out hereinafter, are obtained according to the invention by providing a draw mat, such as a felt cloth, which extends from the intake end of the upper conveyor to the discharge end thereof, then bridges the distance between the discharge end of the upper conveyor and the intake end of the lower conveyor and is continued below the level of the lower conveyor to terminate in a freely hanging end portion. The mat is preferably so guided that it defines an acute angle with the top surface of the upper conveyor and is also somewhat tensioned. As a result, the mat acts upon the dough much more intensely than the conventional short draw mat, which can and will readily yield upwardly due to the counter-action of the dough. Moreover, the provision of an extended mat as described makes unnecessary special means for transferring dough from the upper conveyor to the lower conveyor. The invention further encompasses the provision of a pressure plate above the lower conveyor. This plate acts upon the dough with its entire length while the dough is passing between the plate and the lower conveyor. When now the two conveyors are driven in opposition, the coaction between the mat and the upper conveyor, in conjunction with the coaction between the pressure plate and the lower conveyor, subject the dough to two thorough workings while it is passing through the device, and such workings act upon the dough in opposite directions.

As is evident, the dough, while being drawn under the mat by the upper conveyor and under the pressure plate by the lower conveyor, is subjected to a rolling action. As previously pointed out, the opposed directions of travel of the two conveyors, combined with the transfer of the dough from one conveyor to the other by the extended draw mat, produces such rolling action in opposition. Tests have shown that with the device of the invention a highly effective kneading and working of the dough is obtained which results in a fully satisfactory straight sealing or closing of the dough pieces at the ends thereof.

The invention also provides for guiding the mat past the intake end of the lower conveyor by means of a roller which is parallel to an adjacent guide roller for the lower conveyor. Due to such guidance the mat has a freedom of movement which permits it to perform the movements necessitated by the passage of the dough. The mat is preferably guided over its roller so that the mat portion above the roller and the mat portion below the roller define an obtuse angle with each other, thereby avoiding engagement of the mat with the lower conveyor.

The mat is preferably tensioned, for instance, by providing a weight at the free end of the mat. By selecting the size of the weight the working of the device can be conveniently adjusted in accordance with the consistency and other properties of the dough to be worked in the device. An adjustable tensioning of the mat can, of course, also be obtained by providing suitable and conventional spring means.

In addition to the afore-described extended mat, a short auxiliary mat may be provided. This mat is positioned to initiate folding of the dough and other dough-working actions, which are then continued by the extended main mat.

According to a still further aspect of the invention, a pair of spaced-apart guide bars may be provided between the pressure plate and the lower conveyor parallel to the planes thereof. The dough, which when entering between the guide bars is already thoroughly and tightly rolled, is further acted upon along its longitudinal edges by the two guide bars so that the longitudinal edges are smoothed and forced into right angles with the sides of the flattened dough as formed between the pressure plate and the lower conveyor.

The spacing of the guide bars from each other is preferably adjustable. In particular, it is advantageous to arrange the adjustability of the guide bars so that the same can be moved beyond the crosswise width of the pressure plate so that the latter can be lowered toward the lower conveyor between the two guide bars. Such an arrangement has the advantage of giving great versatility to the device of the invention so that the same can be used, for instance, for working long loaves of white bread, strands for making pretzels, and rye or dark bread of standard shapes.

In the accompanying drawing, several preferred embodiments of the invention are shown by way of illustration, and not by way of limitation.

Figure 1:
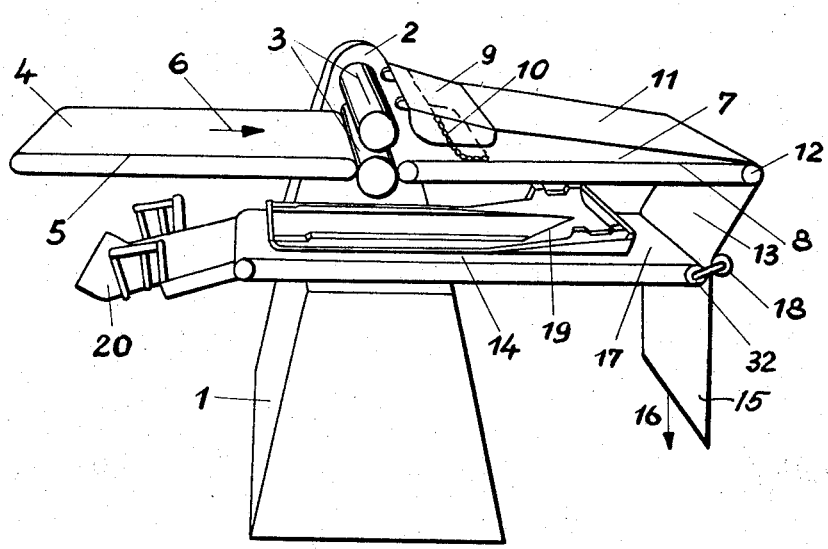
FIG. 1 is a diagrammatic perspective view of a dough-rolling device according to the invention.
Figure 2:
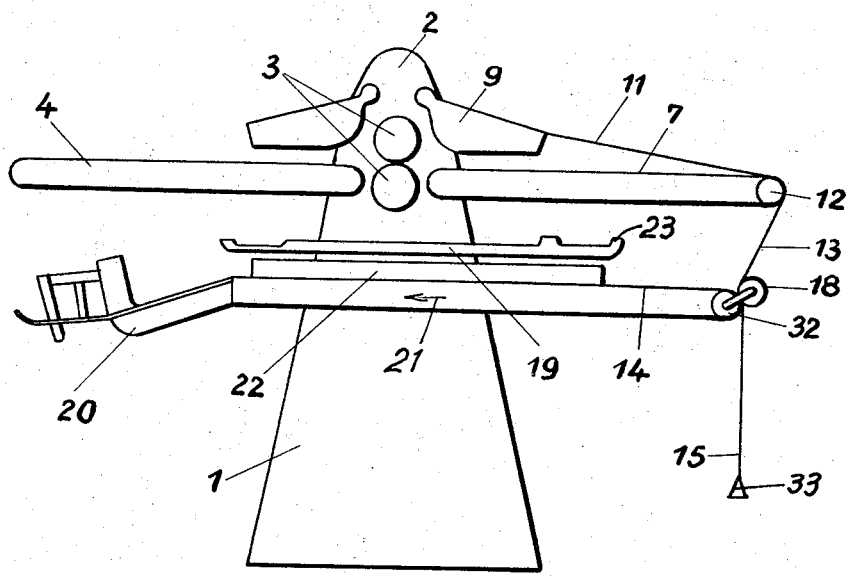
FIG. 2 is a diagrammatic elevational side view of FIG. 1.
Figure 3:
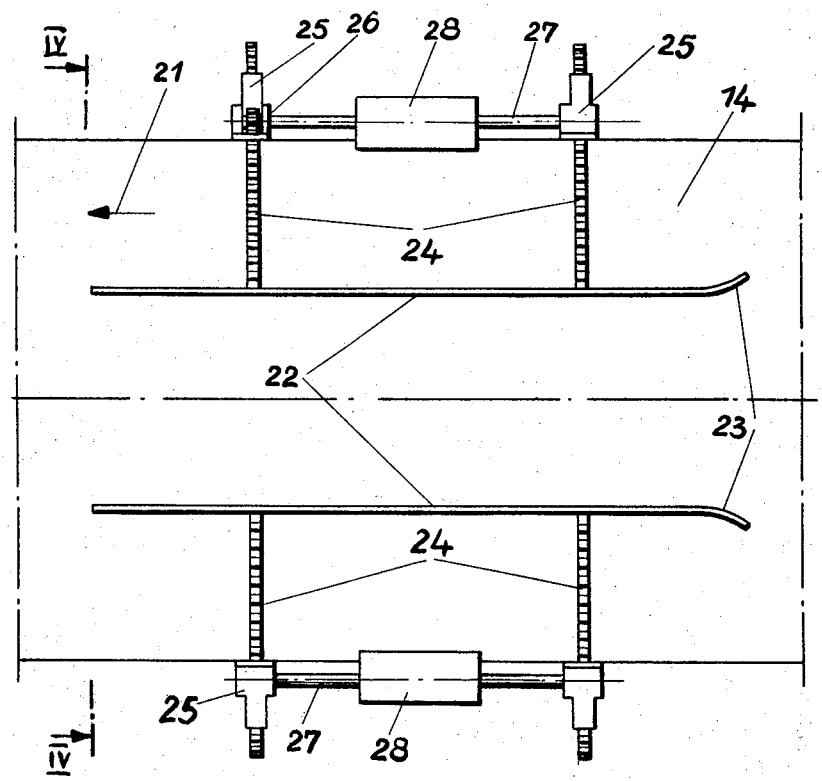
FIG. 3 is a plan view upon the lower conveyor on an enlarged scale.

Referring now to the figures in detail, the dough-rolling device as exemplified in FIGS. 1, 2 and 3 comprises a base 1 supporting a mounting frame 2. The frame mounts a pair of coacting pressure rollers 3. The dough to be worked is fed to the rollers by a feed table 4 formed by an endless conveyor band 5. The direction of travel of conveyor 5 is indicated by an arrow 6. Means may be provided to reverse the direction of travel of the conveyor. The dough emerging from the pressure rollers is fed upon a second table 7 formed by an endless conveyor band 8.

A guard shield 9 provided on the discharge side of the pressure rollers is used to suspend a short draw mat 10, such as a wire netting. As is clearly shown in FIG. 1, the free end of the mat rests upon conveyor band 8, thus initiating the rolling action upon the dough fed from the rollers upon the second conveyor.

The same shield 9 is used also to amount one end of the main draw mat 11, such as a felt cloth. Mat 11 is guided past the discharge end of band 8, and more specifically over a guide roller 12 for the conveyor. The mat then bridges the gap between table 7 and a third table 14 disposed below table 7. Table 14 is formed by an endless conveyor 17, which at its intake end is guided over a roller 32. The portion 13 of mat 11 extending between tables 7 and 14 is guided over a roller 18, which should be visualized as being suitably mounted on the frame structure supporting conveyor roller 32 and other parts of conveyor 17. Roller 18 is so placed that mat portion 13 and a further mat portion 15 extending below the level of table 14 define an obtuse angle with each other so that the mat is not in direct contact with conveyor band 17 of table 14.

The mat may be tensioned by applying a downwardly directed force to its free end, indicated by an arrow 16. A weight 33, diagrammatically shown in FIG. 2, is exchangeably secured to the mat.

A pressure plate 19 is disposed above lower table 14 spaced therefrom.

The finished dough, after passing between the pressure plate and the lower table, is removed from the device at conventional discharge means 20.

Conveyor bands 8 and 17 are driven in opposite directions, as is indicated by an arrow 21 for band 17.

Guide bars 22 are disposed spaced apart between pressure plate 19 and table 14. The feed-in ends of the bars may be slightly bent out, as is indicated at 23. The spacing of the two bars is preferable adjustable. There are shown for the purpose pairs of racks 24 supporting the two bars. Each rack is in mesh with a suitable pinion 26 supported in a casing 25. The two pinions of each guide bar are mounted on a common shaft 27 which can be angularly adjusted by a hand wheel or other suitable adjusting means, indicated at 28.

A suitably calibrated scale (not shown) may be provided to facilitate uniform adjustment of both guide bars.

The teeth on racks 24 are preferably extended to such a length that the guide bars can be moved outwardly beyond the lengthwise edges of pressure plate 19 so that the pressure plate can be lowered between the guide bars, if desired.

Figure 4:
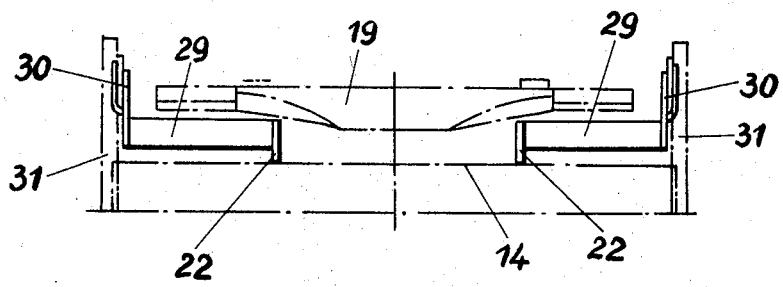
FIG. 4 is an end view of a modification of the lower conveyor.

The arrangement according to FIG. 4 is substantially the same as previously discussed, except that the guide bars 22 are each supported by a bracket 29 which can be hooked by means of hooks 30 into a frame 31 for table 14.

While the invention has been described in detail with respect to certain now preferred examples and embodiments thereof, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A dough-rolling device comprising, in combination, a pair of coacting pressure rollers, an upper transport conveyor disposed posteriorly of said rollers in the direction of travel of the dough through the device, a lower transport conveyor disposed below the upper conveyor, a draw mat extending from substantially an intake end of the upper conveyor adjacent to said rollers to a discharge end of said conveyor and from said discharge end to an intake end of the lower conveyor and below the level of said intake end to terminate in a freely hanging end, and a pressure plate disposed above the lower conveyor substantially parallel thereto.

2. A dough-rolling device according to claim 1 and comprising guide means guiding said draw mat past the intake end of the lower conveyor closely adjacent thereto.

3. A dough-rolling device according to claim 2, wherein said guide means comprises a roller mounted parallel to said intake end of the lower conveyor.

4. A dough-rolling device according to claim 1, wherein said draw mat comprises a felt cloth.

5. A dough-rolling device according to claim 1 and comprising tensioning means at the end of the mat extending below the lower conveyor.

6. A dough-rolling device according to claim 1, wherein the mat portion situated above the upper conveyor is supported and guided to define with said conveyor an acute angle the apex of which is at the discharge end of the upper conveyor.

7. A dough-rolling device according to claim 1 and comprising an auxiliary mat disposed between said pressure rollers and the adjacent intake end of the first-mentioned mat.

8. A dough-rolling device according to claim 1 and comprising a pair of guide bars disposed between said pressure plate and said lower conveyor parallel thereto and extending in the direction of travel of the dough, and adjustment means for varying the spacing between said bars.

9. A dough-rolling device according to claim 8, wherein said adjustment means are arranged to move the guide bars into positions beyond the crosswise width of said pressure plate.

10. A dough-rolling device according to claim 8, wherein said adjustment means comprise gear means.

11. A dough-rolling device according to claim 1 and comprising adjustment means for adjusting the spacing between the pressure plate and the lower conveyor.

References Cited

UNITED STATES PATENTS

| | | | |
|---|---|---|---|
| 2,642,012 | 6/1953 | Sticelber | 107—12 X |
| 2,725,828 | 12/1955 | Stickelber | 107—9 |
| 3,116,703 | 1/1964 | Enoch et al. | 107—4 |
| 3,167,032 | 1/1965 | Rhodes | 107—4 |
| 3,329,100 | 7/1967 | Seewer | 107—12 X |

FOREIGN PATENTS

| | | |
|---|---|---|
| 1,118,856 | 3/1956 | France. |
| 1,176,369 | 11/1958 | France. |
| 556,727 | 8/1932 | Germany. |

LOUIS O. MAASSEL, *Primary Examiner.*